United States Patent
Cho et al.

(10) Patent No.: US 11,785,370 B2
(45) Date of Patent: Oct. 10, 2023

(54) ATTACHABLE VIBRATION SENSOR AND METHOD FOR MANUFACTURING SAME

(71) Applicants: CENTER FOR ADVANCED SOFT ELECTRONICS, Pohang-si (KR); POSTECH ACADEMY-INDUSTRY FOUNDATION, Pohang-si (KR)

(72) Inventors: Kilwon Cho, Pohang-si (KR); Siyoung Lee, Pohang-si (KR); Yoonyoung Chung, Seoul (KR)

(73) Assignees: CENTER FOR ADVANCED SOFT ELECTRONICS, Pohang-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 147 days.

(21) Appl. No.: 16/973,405

(22) PCT Filed: Mar. 8, 2019

(86) PCT No.: PCT/KR2019/002750
§ 371 (c)(1),
(2) Date: Mar. 16, 2021

(87) PCT Pub. No.: WO2019/240355
PCT Pub. Date: Dec. 19, 2019

(65) Prior Publication Data
US 2021/0211794 A1    Jul. 8, 2021

(30) Foreign Application Priority Data

Jun. 14, 2018  (KR) ........................ 10-2018-0067929

(51) Int. Cl.
*H04R 1/08*      (2006.01)
*H04R 31/00*     (2006.01)
(Continued)

(52) U.S. Cl.
CPC .............. *H04R 1/083* (2013.01); *G10L 25/78* (2013.01); *H04R 1/14* (2013.01); *H04R 1/406* (2013.01);
(Continued)

(58) Field of Classification Search
CPC .............. H04R 7/04; H04R 1/14; H04R 1/46
See application file for complete search history.

(56) References Cited

U.S. PATENT DOCUMENTS

2011/0139620 A1* 6/2011 Stumber ............... B01F 25/431
                                                        204/601
2016/0365198 A1  12/2016 Pan et al.
(Continued)

FOREIGN PATENT DOCUMENTS

JP    2014176035 A    9/2014
KR   20110015649 A    2/2011
(Continued)

OTHER PUBLICATIONS

International search report of PCT/KR2019/002750, dated Jun. 21, 2019, English translation.
(Continued)

*Primary Examiner* — Mark Fischer
(74) *Attorney, Agent, or Firm* — STIP Law Group, LLC

(57) ABSTRACT

Proposed is a vibration sensor including: a substrate; a first electrode positioned on the substrate; a support positioned on the first electrode and including a cylindrical hollow hole; and a diaphragm including a thin film positioned on the support and a second electrode positioned on the thin film. According to the present disclosure, it is possible to manufacture a skin-attachable vibration sensor that is attached to a user's neck to detect vibration acceleration in user's neck skin, thus exhibiting a uniform and high sensitivity to a user's voice over the frequency range of the human voice. In (Continued)

addition, the sensor sensitively detects a user's voice through neck skin vibrations rather than through air, thus being free from the influence of external noise or wind, and can recognize the user's voice even in a situation where a user's mouth is covered.

17 Claims, 15 Drawing Sheets

(51) Int. Cl.
*H04R 1/40* (2006.01)
*H04R 3/00* (2006.01)
*H04R 7/04* (2006.01)
*H04R 7/16* (2006.01)
*G10L 25/78* (2013.01)
*H04R 1/14* (2006.01)

(52) U.S. Cl.
CPC ............... *H04R 3/005* (2013.01); *H04R 7/04* (2013.01); *H04R 7/16* (2013.01); *H04R 31/003* (2013.01); *H04R 31/006* (2013.01); *H04R 2307/025* (2013.01)

(56) References Cited

U.S. PATENT DOCUMENTS

| | | | |
|---|---|---|---|
| 2017/0171652 A1* | 6/2017 | Yoo | .......................... H04R 1/04 |
| 2018/0160234 A1 | 6/2018 | Gabai | |
| 2019/0011771 A1* | 1/2019 | Chen | ................. G02F 1/133512 |

FOREIGN PATENT DOCUMENTS

| | | |
|---|---|---|
| KR | 20110114253 A | 10/2011 |
| KR | 20170069805 A | 6/2017 |

OTHER PUBLICATIONS

Office Action from Korea Intellectual Property Office of 10-2018-0067929, dated Apr. 19, 2019.

Office Action from Korea Intellectual Property Office of 10-2018-0067929, dated Dec. 24, 2019.

\* cited by examiner

Scanning route (μm)

ATTACHABLE VIBRATION SENSOR AND METHOD FOR MANUFACTURING SAME

CROSS-REFERENCE TO RELATED APPLICATIONS

This application is the U.S. National Phase under 35 U.S.C. § 371 of International Application No. PCT/KR2019/002750 filed on Mar. 8, 2019, which in turn claims the benefit of Korean Application No. 10-2018-0067929 filed on Jun. 14, 2018, the disclosures of which are incorporated by reference into the present application.

TECHNICAL FIELD

The present disclosure relates to an attachable vibration sensor and a method for manufacturing the same. More particularly, the present disclosure relates to a skin-attachable ultrathin film vibration sensor having a high and uniform sensitivity over the voice frequency range (80 to 3400 Hz) by the use of a crosslinked polymer material and a patterned diaphragm structure, and to a method for manufacturing the same.

BACKGROUND ART

Recently, many companies such as Samsung, Apple, Google, and Amazon have been focusing on businesses related to voice recognition. The human voice is the most valuable biosignal for communication, and voice recognition is expected to occupy more than 15% of the market by 2022 in the human-machine interface (HMI) and Internet of Things (IoT) fields. However, current voice recognition technology is not practical because user's voice can be distorted or difficult to recognize depending on the external environmental factors such as noise or the need to cover a user's mouth. Some technologies recognize voices through a user's neck skin in order not to be affected by the external environment. However, these technologies use plastic chokers when worn on the neck, so that when the chockers are tightened, the skin is compressed, resulting in poor performance, a poor fit, and a poor aesthetic appearance.

Conventional microphones recognize noise and wind in addition to human voices in noisy or windy environments, which makes it difficult to distinguish only human voices separately. In addition, such microphones distort and receive speaker's voice information when a person speaks with his/her mouth covered in cases where a quiet atmosphere or wearing a mask is required. This is because conventional microphones recognize human voices through minute pressure changes in the air. This is affected by changes in other air pressures such as noise and wind, and the air pressure changes caused by speaking is blocked when the mouth is covered, so that the speaker's voice cannot be recognized well. Most conventional vocal cord microphones (laryngophone, throat microphone, etc.) developed to solve this problem convert skin vibrations into voltage signals by using piezoelectric materials, but most commercially available devices are sensors that do not have a uniform sensitivity to vibration intensity or frequency. In addition, because these sensors are worn on the user's neck by using elastic strips or length-adjustable chokers that are tightened to bring devices into intimate contact with the neck, the neck skin is compressed, which may cause distortion in voice measurement.

In order to solve this problem, it is necessary to develop an electronic skin-type wearable microphone, and various research institutes have proposed related devices using various materials and methods. However, some previously developed sensors only detect minute pressure caused by skin vibration, and exhibit insufficient frequency resolution to distinguish human voices. In addition, these sensors exhibit insufficient sensitivity even when voice recognition is possible and thus do not present a quantitative correlation between the recognized voice sound waveform result and voice. In addition, the sensors do not maintain uniform sensitivity over the voice frequency range due to the high damping effects of polymer materials constituting the sensors and structural resonance and damping effects.

Therefore, the electronic skin-type wearable microphones and vibration sensors that have been developed so far do not satisfy essential requirements of a voice recognition device that has to maintain high and uniform sensitivity over the voice band frequency range of 80 to 3,400 Hz, which are the most important frequencies for voice recognition.

In addition, recently, industries related to human-machine interface (HMI) and Internet of Things (IoT) that can control various peripheral devices and environments to suit human convenience have been developed. For this purpose, technologies for detecting dynamic mechanical biological signals that quickly transmit various human intentions and mental states are being developed. Previously developed sensors are widely applied not only to personal use such as health monitoring, but also to various fields requiring control of a surrounding environment, for example, home automation systems and the manufacturing industry. Examples of dynamic mechanical biological signals targeted by these sensors include various body movements such as walking, running, and sitting; facial movements such as mastication movements; movements using hands, vibrations of body organs such as the heart, stomach, and intestines; snoring; and voice. Most of the sensors developed so far to detect these signals are based on silicon wafers, but these sensors are hard, fragile, and difficult to apply to curved surfaces in addition to having high manufacturing costs.

DISCLOSURE

Technical Problem

Accordingly, the present disclosure has been made keeping in mind the above problems occurring in the related art, and an objective of the present disclosure is to provide a skin-attachable vibration sensor that is attached to a user's neck to detect vibrations in user's neck skin, thus exhibiting a uniform and high sensitivity to a user's voice over the frequency range of the human voice.

Another objective of the present disclosure is to provide a voice recognition sensor that sensitively detects vibrations of user's vocal folds, thus being free from the influence of external noise or wind, and can be used even in a situation where a user's mouth is covered.

Still another objective of the present disclosure is to manufacture a vibration sensor that allows for the use of an organic material and has an ultrathin film structure, thus providing a skin-attachable vibration sensor with excellent skin conformity, no vibration signal distortion during detection of skin vibration, a comfortable fit, and an aesthetic appearance.

Technical Solution

According to an aspect of the present disclosure, there is provided a vibration sensor, including: a substrate; a first electrode positioned on the substrate; a support positioned on the first electrode and including a cylindrical hollow hole; and a diaphragm including a thin film positioned on the support and a second electrode positioned on the thin film.

The cylindrical shape of the hollow hole may include at least one selected from a circular cylindrical shape, an elliptical cylindrical shape, a polygonal cylindrical shape, and a star-like cylindrical shape.

The cylindrical hollow hole may be in contact with the diaphragm, and the longitudinal direction of the cylindrical hollow hole may be perpendicular to the surface direction of the first electrode.

The cylindrical hollow hole may be in contact with the diaphragm, and the diaphragm may be parallel to a surface of the first electrode.

The second electrode may be positioned on the thin film, pluralities of corresponding through-holes may be formed through the thin film and the second electrode, and the through-holes may be formed above the cylindrical hollow hole.

The substrate may include at least one selected from polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, polymethyl methacrylate, acrylonitrile butadiene styrene resin, epoxy resin, acrylic resin, novolac resin, and formaldehyde resin.

The first electrode and the second electrode may each independently include at least one selected from gold, titanium, platinum, nickel, palladium, copper, zinc, cadmium, iron, cobalt, iridium, tin, gallium, aluminum, manganese, chromium, molybdenum, tungsten, graphene, carbon nanotubes, and graphite.

The first electrode and the second electrode may each independently be a titanium/gold layer in which a titanium layer and a gold layer are sequentially layered, the titanium layer of the first electrode may be in contact with the substrate, and the titanium layer of the second electrode may be in contact with the diaphragm.

The thickness of the titanium layer may be 2 to 10 nm.

The support and the thin film may each independently include at least one selected from epoxy resin, acrylic resin, novolac resin, formaldehyde resin, polymethyl methacrylate, polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, and polyacrylonitrile butadiene styrene.

The total thickness of the vibration sensor may be 0.1 to 10 μm.

The diameter of the cylindrical hollow hole may be 50 to 1000 μm.

The vibration sensor may be an attachable vibration sensor.

The vibration sensor may be attached to the neck skin of the human body to recognize a voice through vibration.

The vibration sensor may recognize a voice by detecting neck skin vibration acceleration of skin surfaces (neck skin) of speech organs (vocal folds and articulators) in linear proportion to sound pressure of sound generated by the speech organs and released into air.

The vibration sensor may detect a frequency of 70 to 3,500 Hz.

The vibration sensor may further include: an adhesive layer provided between the first electrode and the support.

The adhesive layer may include at least one selected from epoxy resin, acrylic resin, novolac resin, formaldehyde resin, polymethyl methacrylate, polystyrene, polyamide, polyimide, polyurea, polyurethane, and polydimethylsiloxane.

According to another aspect of the present invention, there is provided a vibration sensor array including a plurality of vibration sensors.

According to still another aspect of the present invention, there is provided a method of manufacturing a vibration sensor, the method including the steps of: (a) forming a first electrode on a substrate to manufacture a bottom plate including the first electrode/substrate; (b) forming a sacrificial layer on a base material and forming a second electrode on the sacrificial layer; (c) forming a thin film on the second electrode to form a diaphragm including the second electrode and the thin film; (d) forming a support layer having a cylindrical hollow hole on the diaphragm to form the base material/sacrificial layer/second electrode/diaphragm/support layer; (e) etching the sacrificial layer of the base material/sacrificial layer/second electrode/diaphragm/support layer to manufacture a top plate including the second electrode/diaphragm/support layer; and (f) placing the support layer of the top plate on the first electrode of the bottom plate.

The method may further include: (d') forming an adhesive layer on the first electrode of the bottom plate between the steps (e) and (f).

In the steps (b) and (c), the thin film and the second electrode may be patterned to form pluralities of corresponding through-holes through the thin film and the second electrode.

Advantageous Effects

According to the present disclosure, it is possible to manufacture a skin-attachable vocal cord microphone that is attached to a user's neck to detect vibration acceleration in user's neck skin, thus exhibiting a uniform and high sensitivity to a user's voice over the frequency range of the human voice.

In addition, it is possible to sensitively detect a user's voice through neck skin vibrations rather than through air, thus being free from the influence of external noise or wind, and to recognize the user's voice even in a situation where a user's mouth is covered.

In addition, a skin-attachable vibration sensor according to the present disclosure allows for the use of an organic material and has an ultrathin film structure, thereby ensuring excellent skin conformity and thus having no vibration signal distortion during detection of skin vibration and exhibiting a comfortable fit and an aesthetic appearance.

Figure 2A:
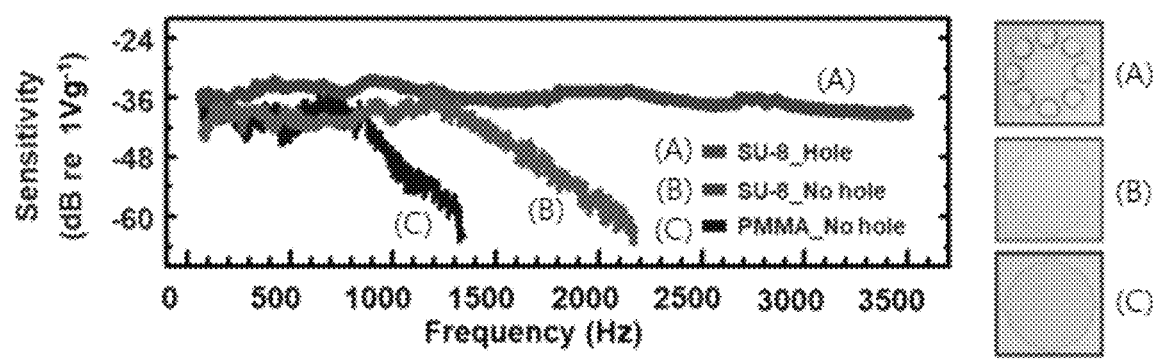
FIG. 2a is a view illustrating the frequency characteristic result according to the voice level ($dB_{SPL}$) of an SU-8 diaphragm with holes (pink) or without the holes (green) and a PMMA diaphragm without holes (blue).
Figure 2B:
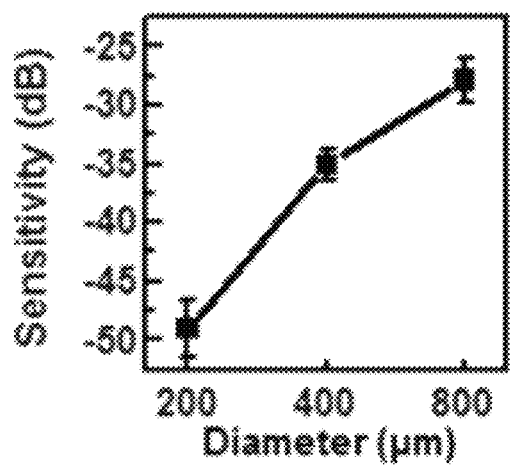

FIG. 2b is a graph illustrating the result of analysis of sensitivity according to the diaphragm diameter of an attachable vibration sensor according to the present disclosure.

Figure 2C:
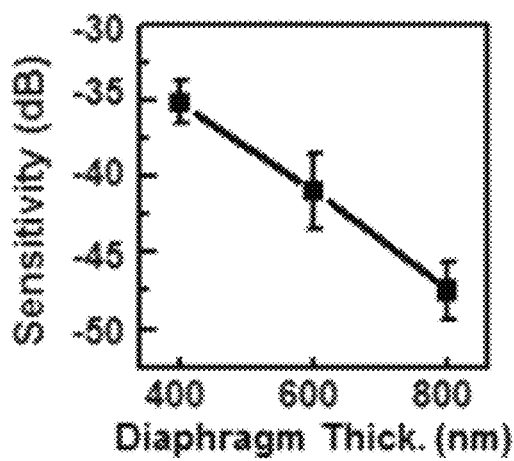

FIG. 2c is a graph illustrating the result of analysis of sensitivity according to the diaphragm thickness of the attachable vibration sensor according to the present disclosure.

Figure 2D:
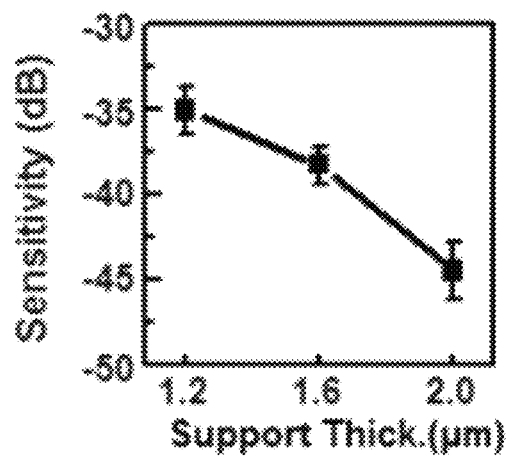

FIG. 2d is a graph illustrating the result of analysis of sensitivity according to the support thickness of the attachable vibration sensor according to the present disclosure.

Figure 2E:
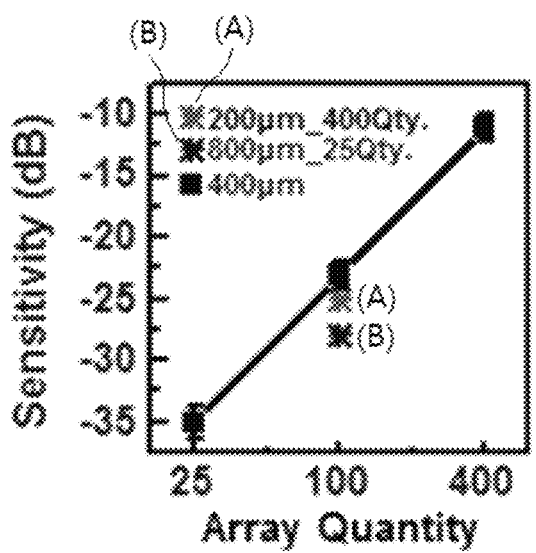

FIG. 2e is a graph illustrating the result of analysis of sensitivity according to the array quantity of the attachable vibration sensor according to the present disclosure.

Figure 2F:
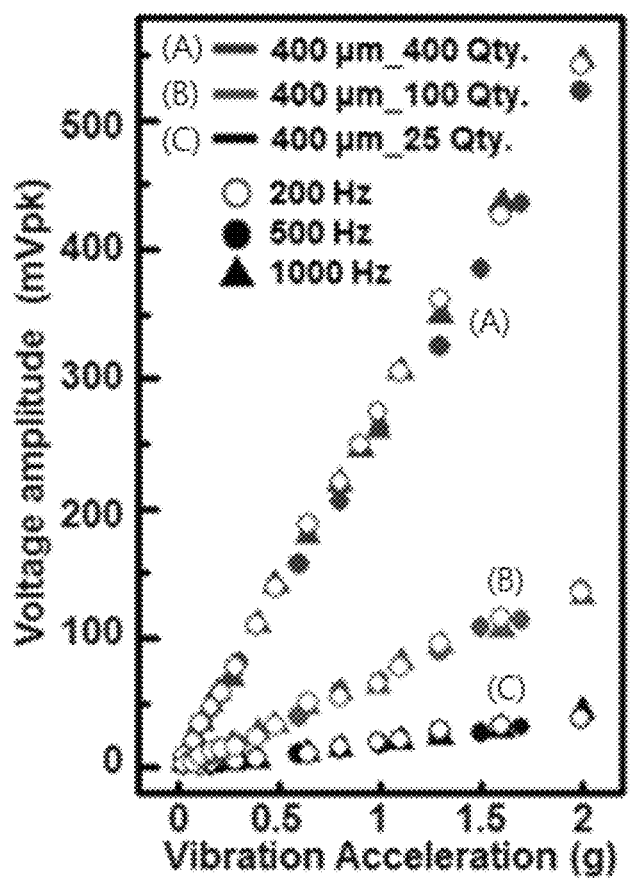

FIG. 2f is a graph illustrating the response signal result according to the vibration intensity of the attachable vibration sensor according to the present disclosure.

Figure 2G:
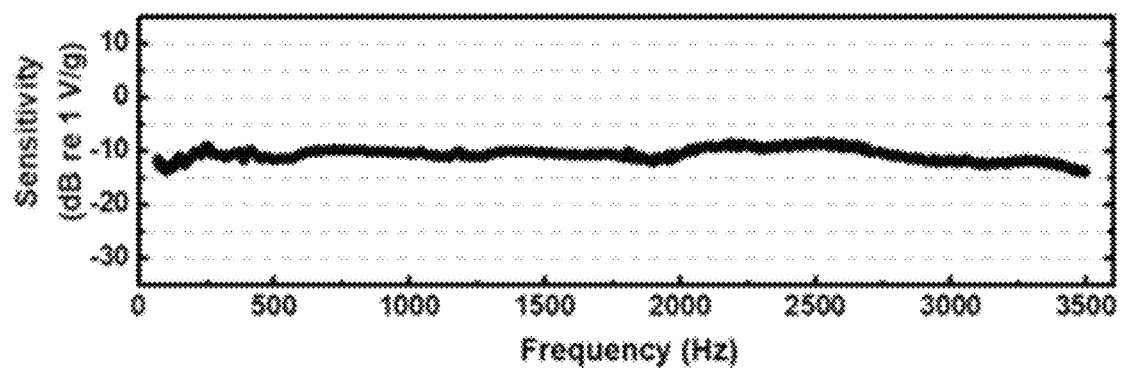

FIG. 2g is a graph illustrating the sensor frequency response according to the vibration of a base over which the attachable vibration sensor according to the present disclosure is attached.

Figure 2H:
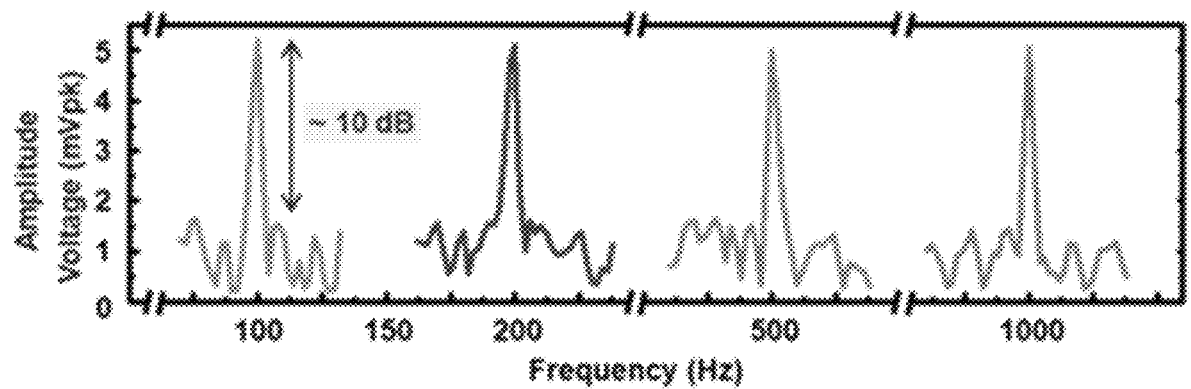

FIG. 2h is a graph illustrating the sensor vibration limit according to the vibration of the base over which the attachable vibration sensor according to the present disclosure is attached.

Figure 3A:
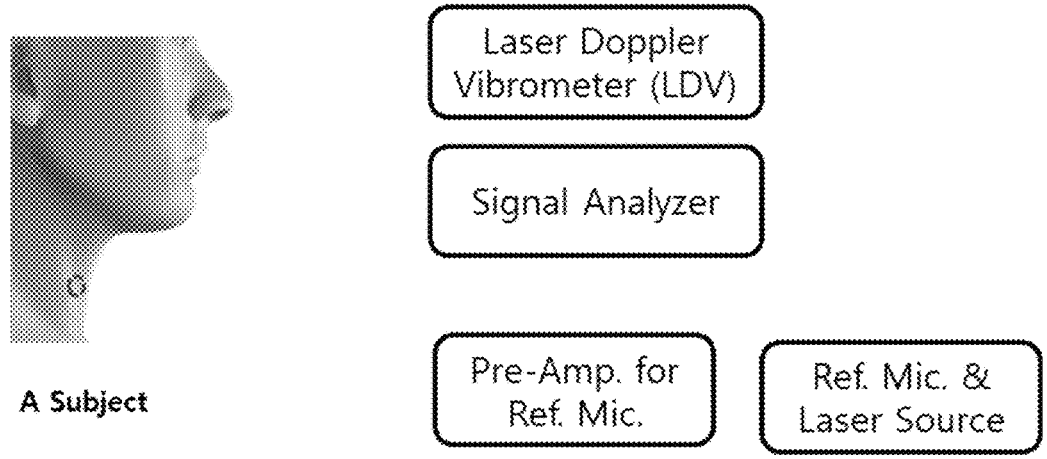

FIG. 3a is a view of an image illustrating a method of simultaneously measuring sound pressure and skin vibration when a person speaks.

Figure 3B:
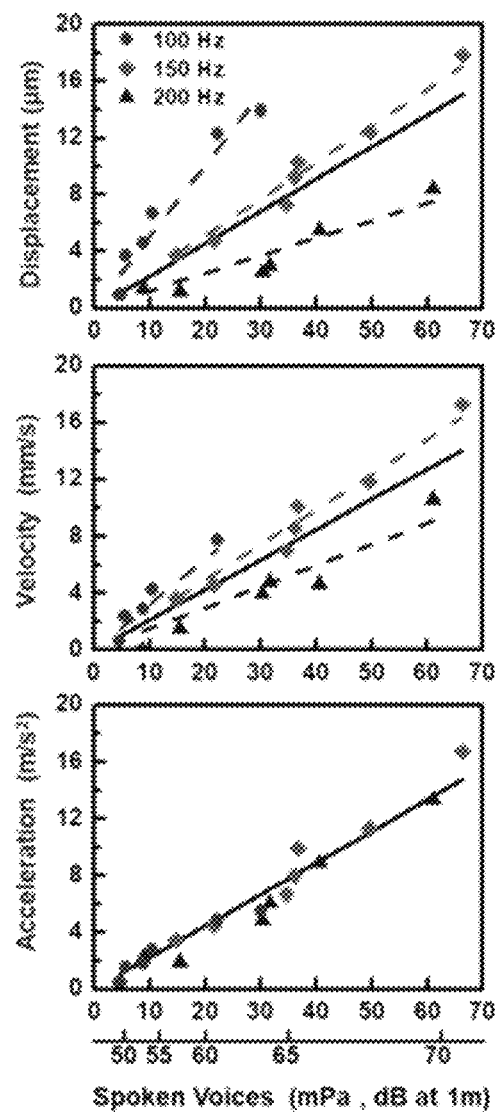

FIG. 3b is a view illustrating the result of measurement in which skin vibration according to the sound pressure is represented as displacement, velocity, and acceleration.

Figure 4:
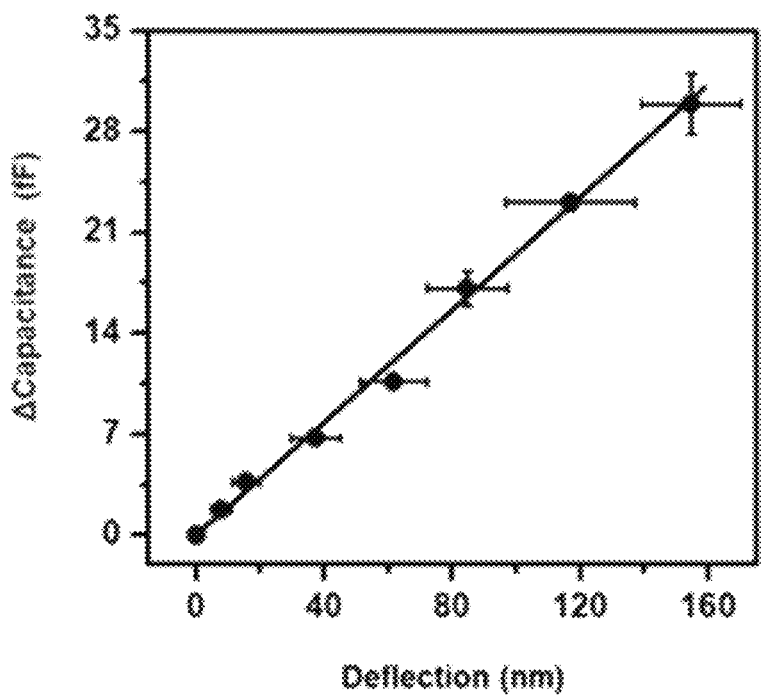

FIG. 4 is a graph illustrating the value of capacitance according to the degree of deflection of the diaphragm of the attachable vibration sensor according to the present disclosure.

Figure 5:
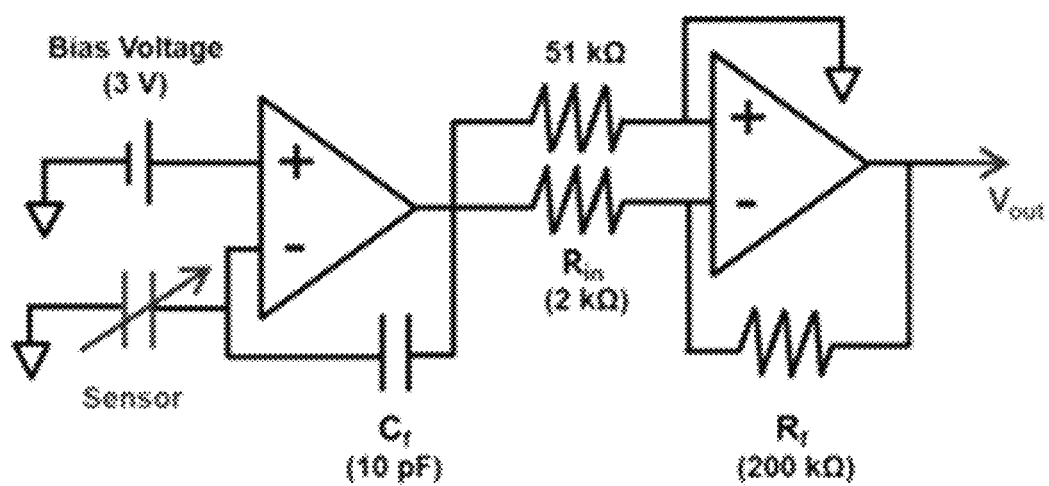

FIG. 5 is a circuit diagram of a circuit attached to the attachable vibration sensor according to the present disclosure.

Figure 6A:
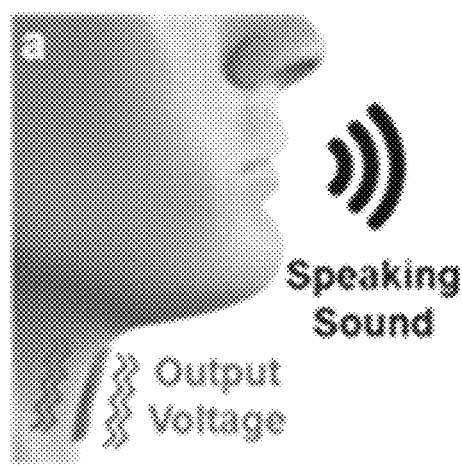
Figure 6A:
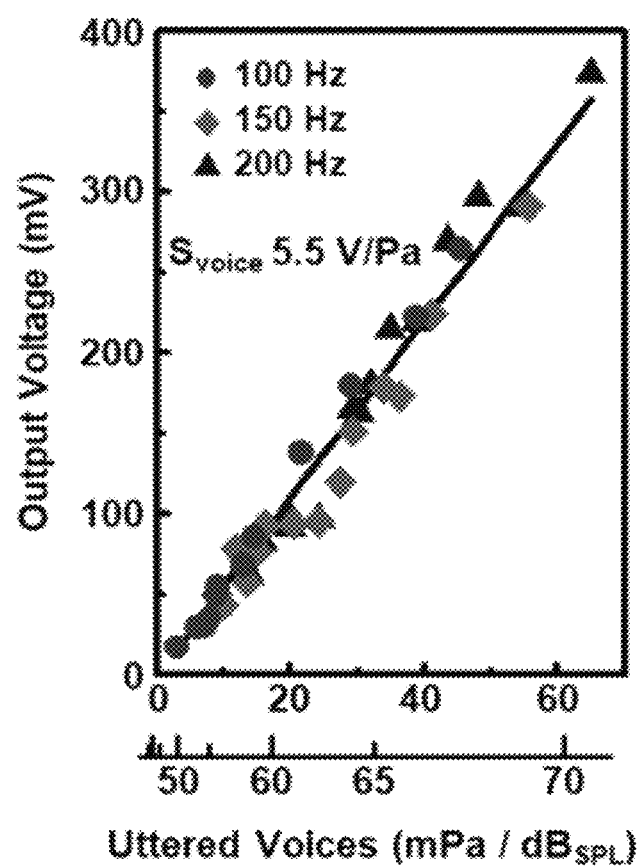

FIG. 6a is a view illustrating the result of measurement of output voltage according to the intensity of uttered voices by attaching the attachable vibration sensor according to the present disclosure to a user's neck.

Figure 6B:
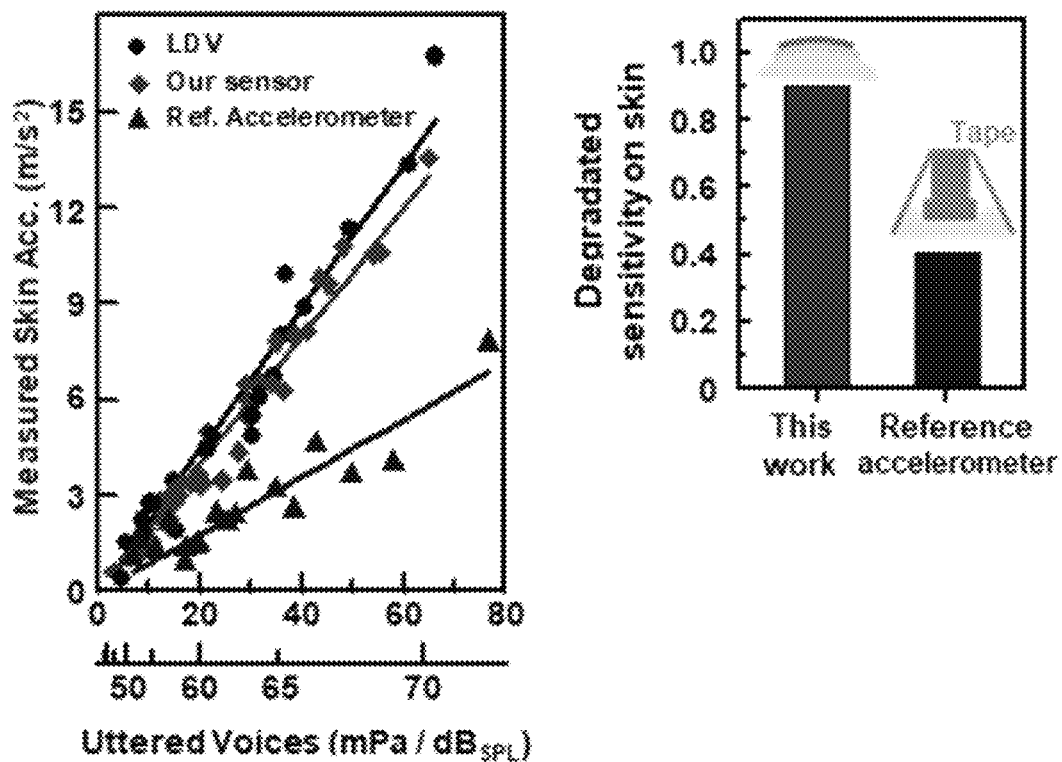

FIG. 6b is a view illustrating the result of analysis of vibration signal distortion reduction according to the skin conformity of the present disclosure.

Figure 7A:
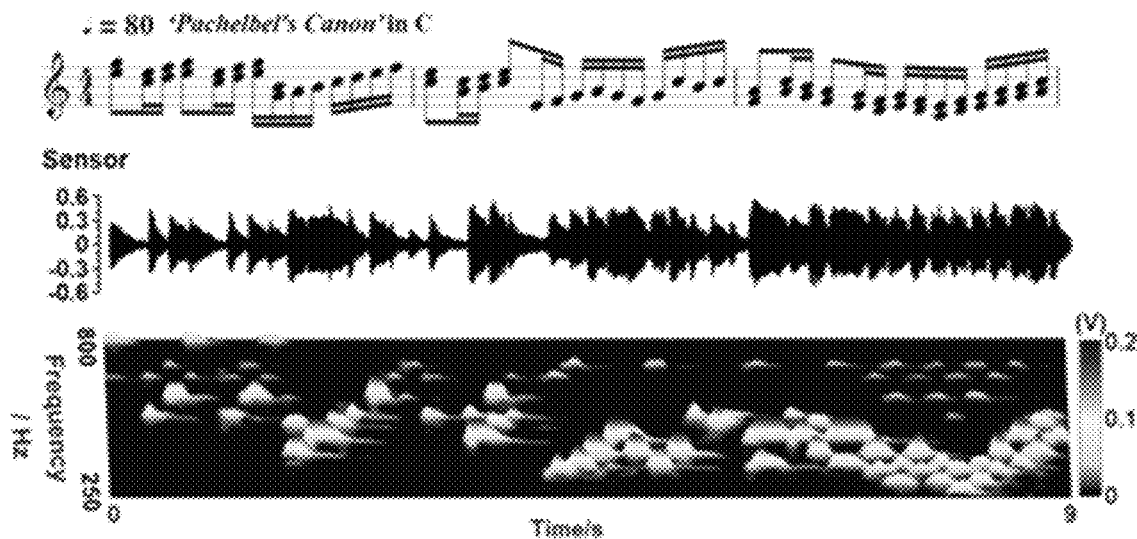

FIG. 7a is a view illustrating the result of a vibration recognition test of the attachable vibration sensor according to the present disclosure.

Figure 7B:
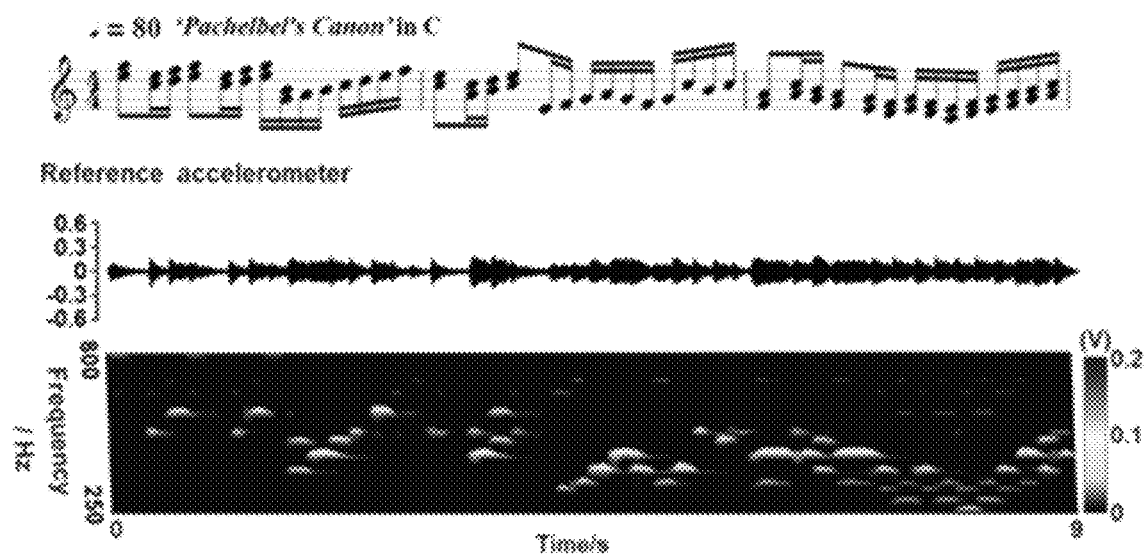

FIG. 7b is a view illustrating the result of a vibration recognition test of a conventional vibration sensor (PCB 352C33, sensitivity: 100 mV/g).

Figure 8:
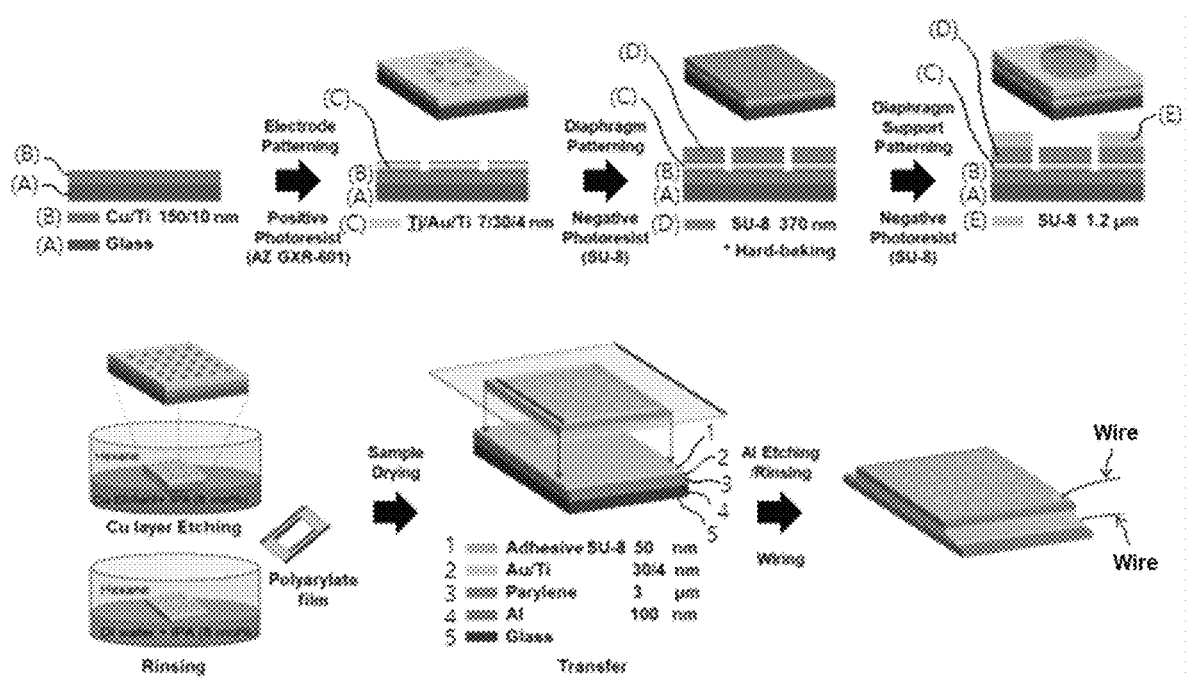

FIG. 8 is a schematic view illustrating a method of manufacturing an attachable vibration sensor according to the present disclosure.

Figure 9:
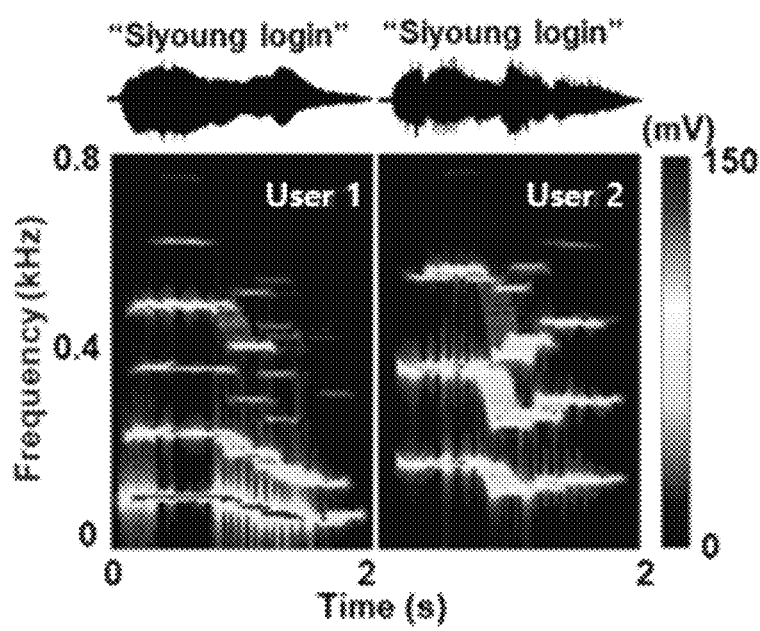

FIG. 9 is a view illustrating the result of comparison analysis of voice sound waveform and frequency spectrum measured by the attachable vibration sensor according to the present disclosure using skin vibrations.

Figure 10:
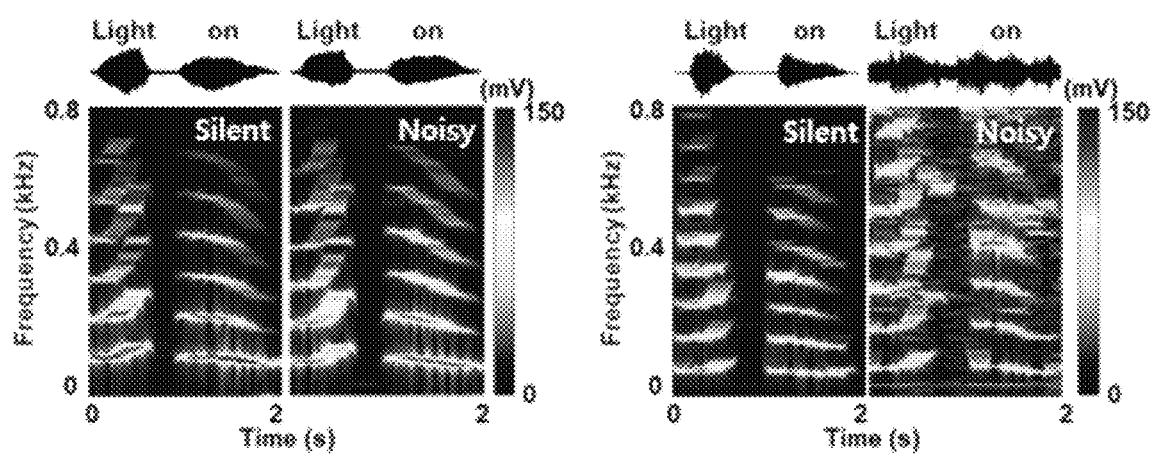

FIG. 10 is a view illustrating the result of analysis of voice sound waveform and frequency spectrum according to the surrounding environment of the attachable vibration sensor according to the present disclosure and a conventional microphone.

Figure 11A:
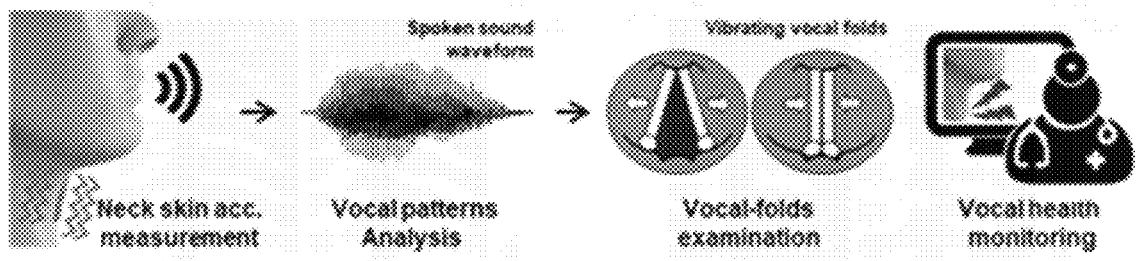

FIG. 11a is a schematic overview illustrating a voice dosimetry process.

Figure 11B:

FIG. 11b is a view illustrating speaking and non-speaking periods distinguished on the basis of vocal data measured by the vibration sensor attached to the neck.

Figure 11C:
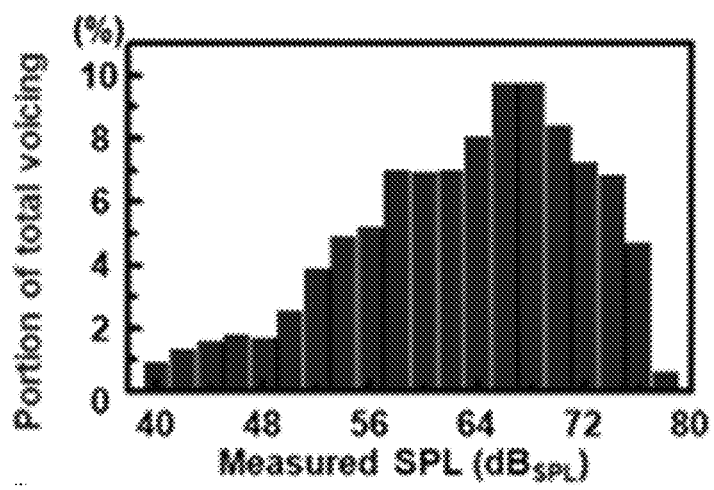

FIG. 11c is a histogram illustrating the distribution of sound pressure levels ($dB_{SPLs}$).

Figure 11D:
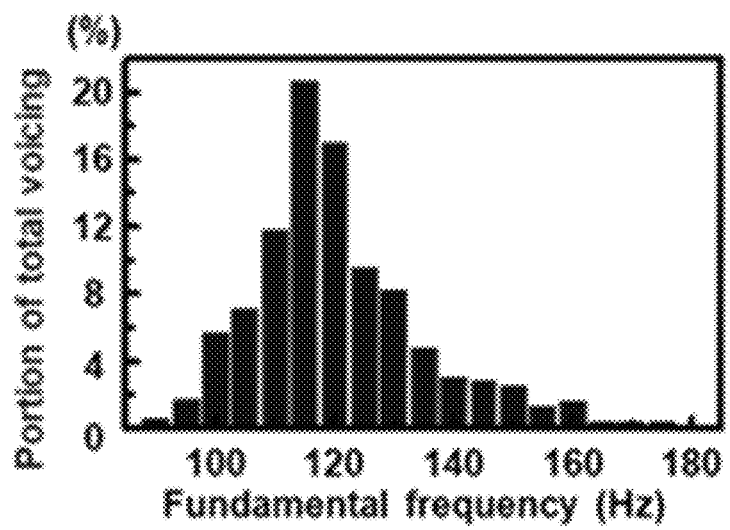

FIG. 11d is a histogram illustrating the distribution of fundamental voice frequencies.

Figure 11E:
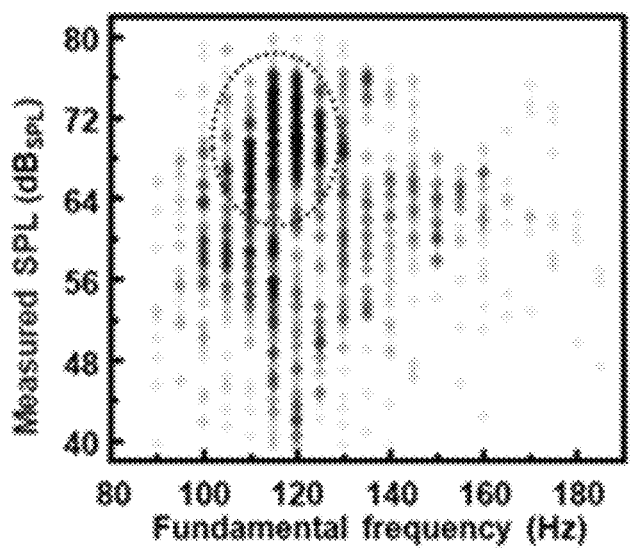
Figure 11F:
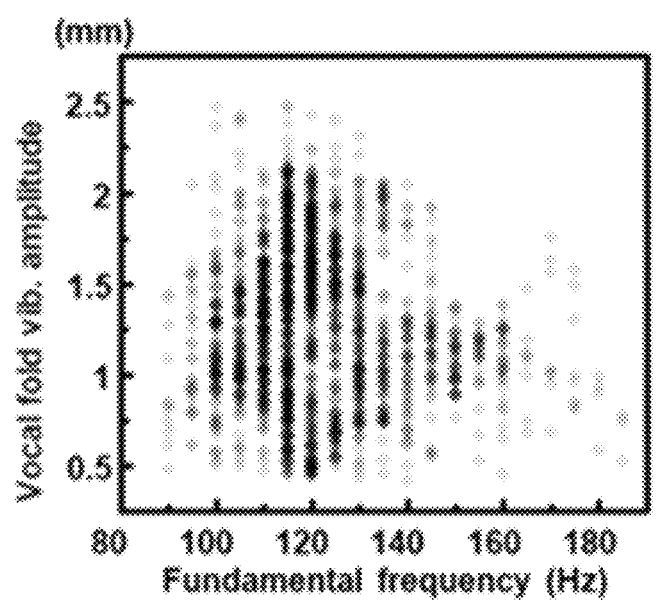

FIGS. 11e and 11f are graphs each illustrating the result of voice dosimetry analysis.

BEST MODE

The present disclosure may be modified in various ways and implemented by various embodiments, so that specific embodiments will be described in detail. However, it is to be understood that the present disclosure is not limited to the specific exemplary embodiments, but includes all modifications, equivalents, and substitutions included in the spirit and the scope of the present disclosure. In the following description, detailed descriptions of known functions and components incorporated herein will be omitted when it may make the subject matter of the present disclosure unclear.

Further, it will be understood that, although the terms first, second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Further, it should be understood that when one element is referred to as being "formed" or "layered" on another element, it may be formed or layered so as to be directly attached to the entire surface or one surface of the other element, or intervening elements may be present therebetween.

As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

The present disclosure relates to a vibration sensor that is attached to a user's neck and detects vibrations in user's neck skin to recognize his/her voice.

Figure 1A:
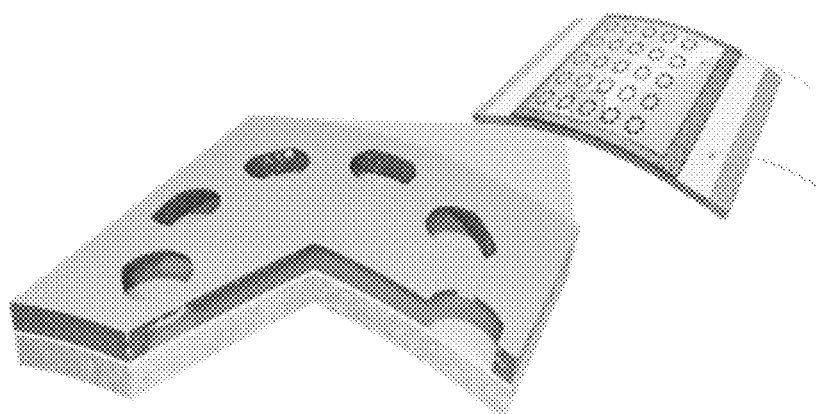
FIG. 1a is a view illustrating the structure and cross-section of a skin-attachable diaphragm according to the present disclosure.
Figure 1B:
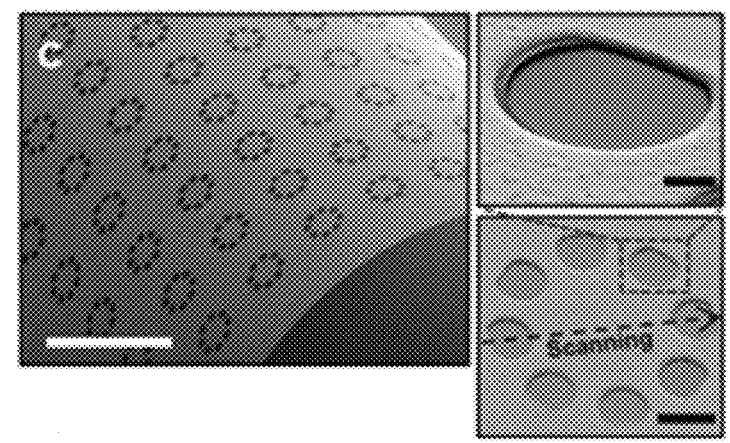
FIG. 1b is a view illustrating a diaphragm array, a unit through-hole, and through-holes, and a Z-profile in cross-section.
Figure 1B:
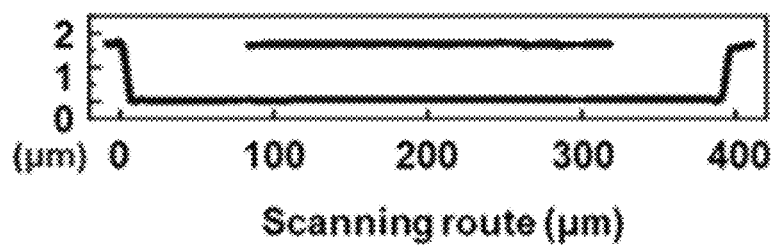
Figure 1C:
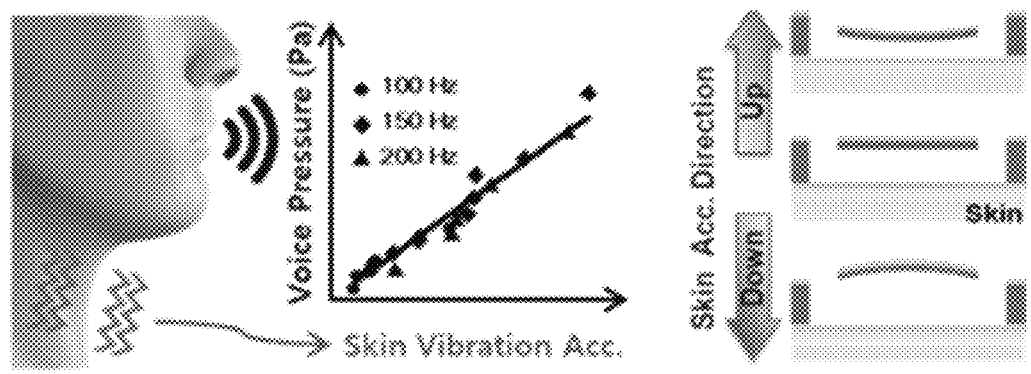
FIG. 1c is a schematic view illustrating the principle of operation of a device including the attachable diaphragm.

FIGS. 1a to 1c are schematic views illustrating the structure and operation principle of an attachable vibration sensor according to the present disclosure.

Hereinafter, the attachable vibration sensor according to the present disclosure will be described with reference to FIGS. 1a to 1c.

The present disclosure provides a vibration sensor including: a substrate; a first electrode positioned on the substrate; a support positioned on the first electrode and including a cylindrical hollow hole; and a diaphragm including a thin film positioned on the support and a second electrode positioned on the thin film.

Referring to FIGS. 1b and 8, the total thickness of the vibration sensor may be equal to or less than 10 μm.

The cylindrical hollow hole may be in contact with the diaphragm, and the longitudinal direction of the cylindrical hollow hole may be perpendicular to the surface direction of the first electrode.

The cylindrical hollow hole may be in contact with the diaphragm, and the diaphragm may be parallel to the surface of the first electrode.

The diameter of the cylindrical hollow hole may be 100 to 1000 μm, preferably 200 to 800 μm, and more preferably 300 to 500 μm.

The height of the cylindrical hollow hole may be 0.5 to 3.0 μm, preferably 0.8 to 2.0 μm, and more preferably 1.0 to 1.5 μm.

The cylindrical shape of the hollow hole may include a circular cylindrical shape, an elliptical cylindrical shape, a polygonal cylindrical shape, a star-like cylindrical shape, and the like.

The second electrode may be positioned on the thin film, pluralities of corresponding through-holes may be formed through the thin film and the second electrode, and the through-holes may be formed above the cylindrical hollow hole.

The thickness of the thin film may be 200 to 800 nm, preferably 300 to 700 nm, and more preferably 350 to 500 nm.

The number of the through-holes may be 2 to 20, preferably 3 to 16, and more preferably 4 to 10.

The diameter of each of the through-holes may be 10 to 150 μm, preferably 20 to 120 μm, and more preferably 40 to 100 μm.

The substrate may be made of polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, polymethyl methacrylate, acrylonitrile butadiene styrene resin, epoxy resin, acrylic resin, novolac resin, formaldehyde resin, or the like, and preferably polyparaxylylene (parylene, poly(p-xylylene))

The first electrode and the second electrode may each independently include gold, titanium, platinum, nickel, palladium, copper, zinc, cadmium, iron, cobalt, iridium, tin, gallium, aluminum, manganese, chromium, molybdenum, tungsten, graphene, carbon nanotubes, graphite, or the like, and preferably gold and titanium.

The first electrode and the second electrode may each independently be a titanium/gold layer in which a titanium layer and a gold layer are sequentially layered, the titanium layer of the first electrode is in contact with the substrate, and the titanium layer of the second electrode is in contact with the diaphragm.

The titanium layer may have a thickness of 2 to 10 nm. The titanium layer acts to compensate for weak contact between the gold of the second electrode and the support, and thus, the titanium layer is required to have a thickness of equal to or greater than 3 nm.

The support and the thin film may each independently be made of epoxy resin, acrylic resin, novolac resin, formaldehyde resin, polymethyl methacrylate, polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, or polyacrylonitrile butadiene styrene, preferably epoxy resin, and more preferably SU-8.

The total thickness of the vibration sensor may be 0.1 to 10 μm.

The diameter of the cylindrical hollow hole may be 50 to 1000 μm.

The vibration sensor may be an attachable vibration sensor, may be attachable to the skin, and may be attached to the vocal fold skin (neck skin) to recognize a voice through vibration.

The vibration sensor may recognize a voice by detecting neck skin vibration acceleration of skin surfaces (neck skin) of speech organs (vocal folds and articulators) in linear proportion to sound pressure of sound generated by the speech organs and released into air.

The diaphragm refers to a thin, elastic plate. The diaphragm is made of natural rubber, synthetic rubber, or metal plate. The diaphragm is used in various device components by using the property of bending by external force.

The diaphragm may be a photoresist including an epoxy derivative obtained by hard baking. By hard baking, the photoresist may be fully crosslinked to reduce material damping.

The vibration sensor may detect a frequency of 70 to 3,500 Hz, and thus may effectively recognize a human voice.

The vibration sensor may further include an adhesive layer provided between the first electrode and the support, and the adhesive layer may be made of epoxy resin, acrylic resin, novolac resin, formaldehyde resin, polymethyl methacrylate, polystyrene, polyamide, polyimide, polyurea, polyurethane, or polydimethylsiloxane, preferably epoxy resin, and more preferably SU-8.

The present disclosure provides a vibration sensor array including a plurality of vibration sensors.

When a human speaks, his/her voice is transmitted in the form of vibration waves through the skin around the vocal folds. In the vibration sensor according to the present disclosure, the diaphragm moves up and down dynamically by the force of inertia resisting vibration of a base, and the capacitance of the diaphragm is modulated by changes in the distance between the first and second electrodes. At a certain voltage, electric charges flow by capacitance modulation and are accumulated by the array structure, and sensitivity is improved by using a charge/voltage amplifier.

The attachable vibration sensor according to the present disclosure is designed to reflect the fact that the sound pressure during human speech and the neck skin vibration acceleration are proportional. Therefore, the sensor is designed to have a high and uniform sensitivity according to the frequency to the vibration acceleration of the base over which the sensor is attached, and when attached to the skin, has a high and uniform sensitivity according to the frequency to the sound pressure during human speech.

In addition, in order to have a uniform sensitivity, the vibration sensor is designed so that the diaphragm vibrates in proportion to vibration acceleration of the base over which the sensor is attached, and the capacitance of the diaphragm changes proportionally to the vibration, and the capacitance of the diaphragm is converted to an output voltage signal at a constant rate by using the charge/voltage amplifier connected to the sensor.

In the attachable vibration sensor according to the present disclosure, a wide (400 μm wide), ultrathin (400 nm thick) organic diaphragm is suspended on a 1.2 μm thin circular pattern hole. When the diaphragm is wide or a portion on which the diaphragm is suspended is thin, the change in sensitivity is large due to a large capacitance change as the diaphragm moves. If the diaphragm is thin and eight holes exist in the diaphragm, the stiffness of the diaphragm is reduced, so that the diaphragm is liable to move more dynamically by the force of inertia. A plurality (400) of diaphragms may be electrically connected in parallel to form an array structure, and variations in capacitance generated by vibration in respective diaphragm structures may be combined.

The vibration sensor may be used for a microphone, a vocal cord microphone, an electronic skin, a voice recognition device, and the like.

FIG. 8 is a view schematically illustrating a method of manufacturing an attachable vibration sensor according to the present disclosure.

Hereinafter, the method of manufacturing the attachable vibration sensor according to the present disclosure will be described with reference to FIG. 8.

First, a first electrode is formed on a substrate to manufacture a bottom plate including the first electrode/substrate (step a).

The description of the substrate and the first electrode remains the same as that of the attachable vibration sensor according to the present disclosure described above, and thus a detailed description thereof will be referred to the above description.

Prior to the step (a), a step (a') of forming a sacrificial layer on a base material may be performed.

The bottom plate may have a structure in which the base material, the sacrificial layer, the substrate, and the first electrode are layered sequentially.

Examples of the base material may include a glass wafer and a silicon wafer, and the sacrificial layer may be made of copper, aluminum, nickel, or silicon oxide.

Next, a sacrificial layer is formed on a base material, and a second electrode is formed on the sacrificial layer (step b).

Examples of the base material may include a glass wafer and a silicon wafer, and the sacrificial layer may be made of copper, aluminum, nickel, or silicon oxide.

The base material acts as a support for forming the second electrode, and may be removed later together with the sacrificial layer.

The base material including the second electrode may have a structure in which the sacrificial layer is positioned on the base material and the second electrode is positioned on the sacrificial layer.

The description of the second electrode remains the same as that of the attachable vibration sensor according to the present disclosure described above, and thus a detailed description thereof will be referred to the above description.

Next, a thin film is formed on the second electrode to form a diaphragm including the second electrode and the thin film (step c).

After the step (c), a step of performing cross-linking by hard baking may be further performed. This is to reduce material damping by fully crosslinking an epoxy resin (SU-8) used for the diaphragm.

The width of the diaphragm may be 100 to 2500 μm, preferably 150 to 850 μm.

The description of the diaphragm remains the same as that of the attachable vibration sensor according to the present disclosure described above, and thus a detailed description thereof will be referred to the above description.

In the steps (b) and (c), the thin film and the second electrode may be patterned to form pluralities of corresponding through-holes through the thin film and the second electrode.

Next, a support layer having a cylindrical hollow hole is formed on the diaphragm to form the base material/sacrificial layer/second electrode/diaphragm/support layer (step d).

The description of the support layer remains the same as that of the attachable vibration sensor according to the present disclosure described above, and thus a detailed description thereof will be referred to the above description.

The sacrificial layer of the base material/sacrificial layer/second electrode/diaphragm/support layer is etched to manufacture a top plate including the second electrode/diaphragm/support layer (step e).

Next, the support layer of the top plate is placed on the first electrode of the bottom plate (step f).

The description of the first electrode remains the same as that of the attachable vibration sensor according to the present disclosure described above, and thus a detailed description thereof will be referred to the above description.

The description of the substrate remains the same as that of the attachable vibration sensor according to the present disclosure described above, and thus a detailed description thereof will be referred to the above description.

The present disclosure may further include a step (d') of forming an adhesive layer on the first electrode of the bottom plate.

A step (f) may be performed in two steps. First, the top plate is placed on a holder in which holes are formed (step f-1). Finally, a diaphragm lamination body is transferred by placing the support layer of the top plate on the bottom plate so as to come into contact with the first electrode (step f-2).

After the step (f-2), a step (f-3) of removing the sacrificial layer of the top plate may be additionally performed.

Examples of the holder may include a polymer film, and the polymer film is made of preferably polyarylate, polyethylene terephthalate, or polyimide, and more preferably polyarylate.

The thickness of the holder may be 25 to 300 μm, preferably 50 to 250 μm.

The polymer film used as the holder has excellent heat resistance properties.

MODE FOR INVENTION

Hereinafter, the present disclosure will be described in more detail through examples. However, this is for illustrative purposes, and the scope of the present disclosure is not limited thereby.

EXAMPLE

Example 1: Manufacturing of Attachable Vibration Sensor (Manufacturing of Diaphragm and Diaphragm Array)

First, Cu/Ti (150/10 nm) to act as a sacrificial layer was deposited onto a glass wafer, and an electrode pattern was then deposited by patterning a metal including Ti/Au/Ti (4/30/7 nm) corresponding to a second electrode using a positive PR. Thereafter, a diaphragm including eight through-holes patterned using SU-8 (370 nm), which is a negative PR, was formed, followed by hard baking. At this time, the diameter of each of the through-holes is about 80 μm. Thereafter, a support layer (1.2 μm) including a cylindrical hollow hole was formed by patterning using SU-8 once more. At this time, the diameter of the cylindrical hollow hole is 400 μm. When an array-type pattern is used instead of a single diaphragm pattern during pattering of the diaphragm, a diaphragm array may be manufactured.

(Manufacturing of Bottom Plate)

First, Al (100 nm) to act as a sacrificial layer was deposited on a glass wafer, then parylene (3 μm) was deposited, and Ti/Au (4/30 nm) as a first electrode was deposited.

(Vibration Sensor Including Diaphragm Array)

The Cu used as the sacrificial layer in the array was removed by using an etchant, and the etchant was rinsed through a rinsing process. At this time, since the array (diaphragm lamination body) is liable to be damaged, the Cu was removed by using an etchant in which a Cu etchant, which is a water-based etchant, was diluted with IPA, and hexane was placed thereon.

Thereafter, a polyarylate film having a high heat resistance was formed into a net shape, and the array from which the Cu sacrificial layer was removed was scooped with the polyarylate film and dried in air. An SU-8 adhesive layer (50 nm) was then coated on the manufactured bottom plate, and the array was transferred thereon. At this time, the support layer of the diaphragm lamination body to be transferred and the adhesive layer of the bottom plate were chemically bonded under exposure to UV radiation.

After bonding, Al (sacrificial layer) located under parylene of the bottom plate was etched and rinsed, and then the array and the bottom plate were connected to a circuit to manufacture an attachable vibration sensor.

Comparative Example 1: General Microphone

Pressure-field ½ microphone type 4192 from Bruel & Kjaer was used.

Comparative Example 2: Conventional Vibration Sensor

PCB Model 352C33 from piezotronics was used.

TEST EXAMPLE

Test Example 1: Effect of Diaphragm Material and Geometry on Sensitivity and Frequency Response FIG. 2a is a view illustrating the frequency characteristic result according to the voice level ($dB_{SPL}$) of an SU-8 diaphragm with holes (pink) or without the holes (green) and a PMMA diaphragm without holes (blue); FIGS. 2b, 2c, 2d, and 2e are views illustrating the result of analysis of sensitivity according to the diaphragm diameter, diaphragm thickness, support thickness, and array quantity, respectively; and FIG. 2f is a view illustrating the result of vibration response curve analysis.

Referring to FIG. 2a, in the case of a diaphragm (pink) including the SU-8 diaphragm with holes, it was found that as the frequency increased, the sensitivity was maintained. However, in the case of a diaphragm (green) including the SU-8 diaphragm without holes and a diaphragm (blue) including the PMMA diaphragm without holes, it was found that the sensitivity was maintained constant up to 900 Hz but then decreased.

This is believed because a uniform sensitivity is not maintained at high frequencies due to material and structural damping. First, it is believed that the use of fully crosslinked SU-8 as a diaphragm material overcomes considerable damping effects, which is a material limitation of organic materials. This is because when PMMA is used as a diaphragm material, damping occurs due to the movement of polymer chains and functional groups when the diaphragm vibrates, but SU-8 can greatly reduce damping caused by chain movement due to its fully crosslinked polymer structure. In addition, in the case of a diaphragm without holes, when there is less air beneath the diaphragm, the damping effects according to the frequency are large, which limits the movement of the diaphragm. This tendency increases the damping effects as the frequency increases, and even though material damping is reduced, a uniform sensitivity cannot be maintained according to the frequency due to structural damping. Thus, if holes exist in the diaphragm, the damping effects due to air beneath the diaphragm can be reduced. In addition, the holes can increase the sensitivity by reducing the stiffness of the diaphragm.

Therefore, the vibration sensor including SU-8 with holes, which is manufactured according to Example 1, can have a uniform sensitivity according to the frequency.

Meanwhile, referring to FIG. 2b, it was found that as the diameter of the diaphragm increased, the sensitivity increased. This is because the area of the diaphragm increases with the increase in its diameter, and the change in the capacitance of the diaphragm increases as much as the area increased for the same deflection, thereby increasing the sensitivity. However, as the area increases, the increase in the sensitivity is hindered by the resistance of the air beneath the diaphragm.

Thus, the sensitivity increased as the diameter of the diaphragm increased, but an increase width in the sensitivity decreased.

Referring to FIG. 2c, it was found that as the thickness of the diaphragm increased, its stiffness increased, with the result that the sensitivity decreased. As the thickness of the SU-8 diaphragm increases, its mass increases proportionally, which is a factor that increases the sensitivity, but the effect is not significant because a gold electrode with a mass density 16 times greater than that of the diaphragm exists. As the thickness of the SU-8 diaphragm increases, its capacitance decreases, with the result that the variation in the capacitance also decreases. However, the decrease in the capacitance variation of the diaphragm is not as large as the change in its thickness.

As a result, the stiffness of the diaphragm is greatly affected by the increase in its thickness, thereby reducing the sensitivity.

Referring to FIG. 2d, it was found that as the thickness of the support increased, the sensitivity decreased. This is because as the thickness of an air film under the diaphragm increases, an initial capacitance value decreases greatly, with the result that a capacitance change value due to deflection of the diaphragm decreases and the sensitivity decreases. Meanwhile, when the resistance of the air film is reduced, the movement of the diaphragm is facilitated. This tendency suppresses the effect of reducing sensitivity when the variation in initial thickness is relatively large. As a result, as the thickness of the support increases, the sensitivity decreases, and the rate of decrease tends to increase.

Referring to FIG. 2e, it was found that as the number of diaphragms of a diaphragm array increased, the sensitivity increased. Since the diaphragm array has a capacitance structure with the diaphragms connected horizontally, the sensitivity is proportional to the number of the diaphragms. The area of the sensor that is attachable to the neck skin is limited, and thus, the maximum number of diaphragms that can be manufactured in the same area is inversely proportional to the square of the radius of each diaphragm. From this, it was found that the sensitivity when the radius of the diaphragm was 400 μm was greater than when the radius thereof was 200 μm and 800 μm.

Therefore, it is believed that it is necessary to manufacture an array with an appropriate number of diaphragms is required in order to manufacture a sensor having excellent sensitivity.

Referring to FIG. 2f, it was found that when the diaphragm thickness is 400 μm, and the number of diaphragms of each array is 25, 100, and 400, the voltage amplitude according to the vibration acceleration is constant regardless of the frequency, and the sensitivity is constant regardless of the vibration intensity. The range of applied vibration intensities (~2 g) is a range that reflects the acceleration range of neck skin vibrations during human speech, which indirectly shows that the attachable vibration sensor according to the present disclosure can detect all human voices through the neck skin vibration.

FIG. 2g is a graph illustrating the sensor frequency response according to the vibration of a base over which the attachable vibration sensor according to the present disclosure is attached when the diameter thickness is 400 μm and the number of diaphragms of an array is 400; and FIG. 2h is a view illustrating the sensor vibration limit according to the vibration of the base over which the attachable vibration sensor according to the present disclosure is attached.

Referring to FIG. 2g, as a result of measuring the voltage output sensitivity of the vibration sensor of Example 1, it was found that the vibration sensor generally maintained a uniform vibration sensitivity of 270 mV/g over the voice band frequency range (80 to 3400 Hz) in a voice recognition device.

Referring to FIG. 2h, it was found that when a vibration of 0.02 g is given as a vibration of the base over which the sensor is attached in order to analyze the measurement limit of the sensor, the sensor exhibited a signal-to-noise ratio of about 10 dB for each frequency. Since 0.02 g is less than the smallest vibration (0.03 g) of the neck skin vibrating when a human speaks, it was found that almost all vibrations arising in the vocal folds vibrating during speech could be detected.

Therefore, it was found that the attachable vibration sensor according to the present disclosure had a uniform high sensitivity regardless of the frequency, and could detect even the smallest voice vibration arising in human speech and thus exhibited excellent sensitivity.

Test Example 2: Measurement of Width, Vibration Velocity, and Acceleration of Skin Vibration According to Vocal Intensity FIG. 3a is a photograph illustrating a method of measuring skin vibration when a person speaks in order to know which parameter of skin vibration has to be received by a sensor to quantitatively recognize a human voice through skin vibration, and FIG. 3b is a view illustrating a measurement result in which skin vibration according to the sound pressure is represented as displacement, velocity, and acceleration after measurement.

Referring to FIG. 3b, it was found that no matter which parameter of skin vibration represented the sound pressure, there was a linear relationship between the sound pressure and the vibration parameter for a specific frequency. However, it was found that vibration acceleration was a parameter having a uniform linear relationship for all frequencies.

In addition, it was found that if a sensor capable of measuring the acceleration of neck skin vibration was manufactured, human voices could be quantitatively recognized through the skin vibration.

For reference, the following Equation 1 relates to the principle of operation of a device. Referring to Equation 1 below, the intensity of spoken voices and the acceleration of neck skin vibration are proportional regardless of the frequency, and the magnitude of the vibration acceleration and the change in a bottom electrode-diaphragm distance are linearly proportional. This tendency is maintained until the resonance frequency is reached by adjusting the damping coefficient, but the device according to the present disclosure is >80 kHz and thus has a condition to maintain sensitivity over the frequency range of the human voice.

Therefore, when a circular diaphragm moves, the degree of deflection of the diaphragm and the capacitance value that changes accordingly have a proportional relationship, and the changed capacitance is converted to a voltage at a certain rate.

$$V_{out} \propto 0.223(P_{voice}) \times \frac{1}{\omega_n^2 \sqrt{(1-\Omega^2)^2 + \tan^2\phi_t}} \times \frac{\partial C_d}{\partial w_d} \times \frac{V_{bias} R_f}{C_f R_{in}}$$ [Equation 1]

In Equation 1 above, $P_{voice}$ is the neck skin vibration acceleration, which is the spoken voice pressure, $\omega_n$ is the natural frequency of each of supported diaphragms (equivalent to $$\sqrt{\frac{k}{m}},$$

where k is the stiffness of the diaphragm and an air film under the diaphragm, m is the mass of the diaphragm), $\Omega$ is the applied frequency relative to the natural frequency, $$\frac{\partial C_d}{\partial w_d}$$

is the ratio of the change in capacity to the center deflection of the diaphragm, $v_{bias}$ is the constant voltage biased to the sensor, $C_f$, $R_f$, and $R_{in}$ are the feedback capacitance, feedback resistance, and input resistance for an amplifier circuit, respectively.

Test Example 3: Capacitance Analysis According to Degree of Deflection of Attachable Vibration Sensor FIG. 4 is a graph illustrating the value of capacitance according to the degree of deflection of the diaphragm of the attachable vibration sensor according to the present disclosure.

Referring to FIG. 4, it was found that as the degree of deflection increased, the capacitance value increased, so that the degree of warpage and the capacitance value had a proportional relationship.

This result is one of the arguments supporting the logic that the attachable vibration sensor according to the present disclosure can quantitatively recognize sound pressure. The sound pressure during human speech is proportional to the acceleration of skin vibration, the degree of deflection of the diaphragm is proportional to the magnitude of the skin vibration acceleration, and the capacitance value is proportional to the degree of deflection as illustrated in FIG. 4.

Referring to the circuit illustrated in FIG. 5, its capacitance is proportionally converted into a voltage signal through the circuit. As a result, the attachable vibration sensor recognizes the sound pressure by converting the same proportionally into the voltage signal, and thus recognizes the sound pressure with a uniform sensitivity despite changes in vocal intensity and frequency.

Test Example 4: Analysis of Output Voltage of Attachable Vibration Sensor According to Intensity of Human Voice FIG. 6a is a view illustrating the result of measurement of the output voltage according to the intensity of uttered voices by attaching the attachable vibration sensor according to the present disclosure to a user's neck, and FIG. 6b is a view illustrating the result of analysis of vibration signal distortion reduction according to the skin conformity of the present disclosure.

Referring to FIG. 6a, the vibration sensor of Example 1 was tested for voices at frequencies of 100, 150, and 200 Hz corresponding to the representative fundamental frequencies of men and in the fundamental voice frequency range of 40 to 70 $dB_{SPL}$, and it was found that the vibration sensor of Example 1 had a high and uniform voice sensitivity (5.5 V/Pa) for all uttered voices.

This result is because the vibration sensor according to the present disclosure was designed to have a high and uniform vibration sensitivity, using the fact that the vocal intensity and the acceleration of skin vibration are proportional during speech.

Referring to FIG. 6b, it is possible to determine the degree of vibration signal distortion of the attachable vibration sensor according to the present disclosure and a conventional vibration sensor (PCB 352C33) of Comparative Example 2 according to the skin conformity during human speech. Since any sensor compresses the skin when attached to the skin, distortion of vibration signals inevitably occurs, resulting in a reduced vibration signal compared to an actual neck skin vibration value (black, measured by a laser Doppler vibrometer (LDV)) during human speech. For example, the conventional vibration can receive a vibration value (blue) that is only 40% of the actual value when attached to the skin. This is because the sensor is made of an inorganic material and is heavy, so the skin is compressed when the sensor is attached to the skin using tape. However, the attachable vibration sensor according to the present disclosure is made of an organic material and has an ultrathin film structure with a total thickness of less than 5 μm, so that high skin conformity is ensured. Therefore, the sensor can receive a vibration value (red) that is very close to the actual value (equal to or less than 90%) when attached to the skin. Thus, the attachable vibration sensor according to the present disclosure can minimize vibrational distortion when detecting skin vibration, and exhibit a comfortable fit and an aesthetic appearance.

Test Example 5: Vibration Recognition Test of Attachable Vibration Sensor

FIG. 7a is a view illustrating the result of a vibration recognition test of the attachable vibration sensor according to the present disclosure, and FIG. 7b is a view illustrating the result of a vibration recognition test of a conventional vibration sensor (PCB 352C33).

To demonstrate the performance of the device, vibrational output was detected while music was played by a vibration speaker. The recording quality of the attachable vibration sensor according to the present disclosure was compared with the conventional vibration sensor (reference accelerometer; PCB 352C33) of Comparative Example 2.

Referring to FIGS. 7a and 7b, it was found that the sensitivity of the attachable vibration sensor according to the present disclosure was about three times higher than that of the conventional vibration sensor (reference accelerometer) of Comparative Example 2. It was also found that the attachable vibration sensor according to the present disclosure had a flat frequency response, excellent frequency resolution, and a high reaction speed to distinguish beats less than 1/16. In addition, it was found that the attachable vibration sensor according to the present disclosure could recognize voices throughout various frequency spectrums without distortion.

Test Example 6: Voice Authentication System Application and Analysis of Possibility to Control Near/Remote Devices Using Voice Recognition FIG. 9 is a view illustrating the result of analysis of voice sound waveform and frequency spectrum by recognizing the same word (Siyoung log-in) phonated by two different users, using the attachable vibration sensor with the diaphragm lamination body according to the present disclosure.

To measure this, a voice login program was installed on a computer and connected to the sensor, then the voice pattern "Siyoung log-in" was set as the login password, and the two different users tried to log in by phonating the password, respectively.

As a result, a user whose voice was not registered in the program could not log in even if he/she phonated the same word.

Referring to FIG. 9, it was found that such a result was shown because the attachable vibration sensor according to the present disclosure could distinguish the unique voice sound waveform and frequency spectrum of each user's voice even when the same word was phonated. In addition, the attachable vibration sensor according to the present disclosure can detect vibrations of the neck skin and recognize the user's voice even in a situation where a user's mouth is covered, thus having the advantage of reducing the possibility of exposing the voice recognition password to others.

FIG. 10 is a view illustrating the result of analysis of voice sound waveform and frequency spectrum according to the surrounding environment of the attachable vibration sensor according to the present disclosure and a conventional microphone of Comparative Example 1.

Referring to FIG. 10, the microphone of Comparative Example 1 (right) was unable to filter out noise sound in the presence of 65 dB of noise, and exhibited recognition results that are different to those obtained in a silent environment. On the other hand, it was found that the attachable vibration sensor according to the present disclosure maintained a uniform voice sound waveform and frequency spectrum regardless of the surrounding environment.

While the conventional microphone of Comparative Example 1 is difficult to use in a noisy environment because the microphone uses air as a medium for voice detection, the attachable vibration sensor according to the present disclosure is not affected by the surrounding environment because the sensor is attached to the neck and detects vibrations of the neck.

Test Example 7: Monitoring of Vocal Health Using Voice Dosimetry

FIG. 11a is a schematic overview illustrating a voice dosimetry process, FIG. 11b is a view illustrating speaking and non-speaking periods distinguished on the basis of vocal data measured by the vibration sensor attached to the neck, FIG. 11c is a histogram illustrating the distribution of sound pressure levels ($dB_{SPLs}$), FIG. 11d is a histogram illustrating the distribution of fundamental voice frequencies, and FIGS. 11e and 11f are views each illustrating the result of voice dosimetry analysis.

Referring to the upper part of FIG. 11a, voice dosimetry is to not only check the usual speech habits through a human voice, but also indirectly measure the usage of the vocal folds to diagnose vocal health. By identifying phonation time, speech frequency, sound volume, etc. on the basis of vocal data, it is possible to ascertain persons' speech habits such as how "loud/high/often" he/she speaks. Moreover, from this, it is possible to ascertain how much the vocal folds have moved, and to check whether the vocal fold tissues have not been used more than necessary. As a result, vocal health can be continuously checked and managed through the voice dosimetry process.

Because of the characteristics of office workers who use their vocal folds a lot, the proportion of office workers who take care of their voices is close to 20% worldwide. Some of those people seek medical help for their vocal health, but there is a limitation in that there is not accurate diagnostic data on their vocal fold use. Voice dosimetry provides these people with accurate diagnostic data to help manage vocal health.

Since voice dosimetry is based on human voice data, existing microphone systems that are affected by external noise/environment by recognizing voices through air have limitations.

In addition, existing vocal cord microphones and wearable microphones under development, which do not have high and uniform sensitivity according to the frequency, obtain distorted voice data and thus are not suitable for voice dosimetry. However, the attachable vibration sensor according to the present disclosure is free from the influence of external noise/environment, only detects user's voice data, and has no distortion of the voice data due to its high and uniform sensitivity, thus being believed to be suitable for voice dosimetry.

Referring to the lower part of FIG. 11b, 4-minutes of vocal data obtained from one participant (subject) using the attachable vibration sensor according to the present disclosure. The measurement was made by intentionally allowing the subject to vocalize loudly and frequently, and the presence or absence of vocalization was checked on the basis of the subject's vocal data.

FIGS. 11c and 11d are histograms illustrating the distribution of the fundamental frequencies and sound pressure levels (SPLs) when the subject spoke, and it was found that the subject mainly spoke at a voice frequency of 60 to 72 $dB_{SPL}$ and 110 to 120 Hz. Considering that the intensity of normal conversation is 40 to 60 $dB_{SPL}$, and the fundamental frequency for a male voice is 130 Hz, it was found that the subject spoke in a loud and low voice.

Referring to FIGS. 11e and 11f, it was found that distance dose of the vocal folds of the subject was ~120 m, which was less than 25% of the medical safety limit for protecting the vocal cord tissue, i.e., 520 m. This result implies that if the subject had spoken with the same voice properties for equal to or greater than 20 minutes, the vocal folds could have been damaged.

For reference, the calculation of the distance dose was performed with reference to Titze I. R., Švec J. G., & Popolo P. S. (2003). Vocal dose measures: Quantifying accumulated vibration exposure in vocal fold tissues. Journal of Speech, Language, and Hearing Research, 46, 919-932. The dotted red circle in FIG. 11e represents the most frequent speech frequencies and sound pressures of the subject.

Therefore, it is believed that the attachable vibration sensor according to the present disclosure can be used to quantitatively measure voice usage and diagnose vocal health.

The scope of the present disclosure is defined by the appended claims rather than the description which is presented above. Moreover, the present disclosure is intended to cover not only the exemplary embodiments, but also various alternatives, modifications, equivalents and other embodiments that may be included within the spirit and scope of the present disclosure as defined by the appended claims.

INDUSTRIAL APPLICABILITY

According to the present disclosure, it is possible to manufacture a skin-attachable vocal cord microphone that is attached to a user's neck to detect vibration acceleration in user's neck skin, thus exhibiting a uniform and high sensitivity to a user's voice over the frequency range of the human voice.

In addition, it is possible to sensitively detect a user's voice through neck skin vibrations rather than through air, thus being free from the influence of external noise or wind, and to recognize the user's voice even in a situation where a user's mouth is covered.

In addition, a skin-attachable vibration sensor according to the present disclosure allows for the use of an organic material and has an ultrathin film structure, thereby ensuring excellent skin conformity and thus having no vibration signal distortion during detection of skin vibration and exhibiting a comfortable fit and an aesthetic appearance.

The invention claimed is:

1. A vibration sensor, comprising:
   a substrate, wherein the substrate comprises a top surface and a bottom surface;
   a first electrode positioned on the top surface of the substrate;
   a support positioned on the first electrode and including a cylindrical hollow hole; and
   a diaphragm including a thin film positioned on the support and a second electrode positioned on the thin film,
   wherein,
   the first electrode in entirety directly contacts with the substrate,
   the substrate is separated from the second electrode by the first electrode and is not in direct contact with the support and the diaphragm, and
   the second electrode, the thin film, and the support are vertically overlapped in the order of the second electrode, the thin film, and the support along a direction perpendicular to the top surface of the substrate.

2. The vibration sensor of claim 1, wherein the cylindrical shape of the hollow hole comprises at least one selected from a circular cylindrical shape, an elliptical cylindrical shape, a polygonal cylindrical shape, and a star-like cylindrical shape.

3. The vibration sensor of claim 1, wherein the cylindrical hollow hole is in contact with the diaphragm, and the diaphragm is parallel to a surface of the first electrode.

4. The vibration sensor of claim 1, wherein the second electrode is positioned on the thin film, pluralities of corresponding through-holes are formed through the thin film and the second electrode, and the through-holes are formed above the cylindrical hollow hole.

5. The vibration sensor of claim 1, wherein the substrate comprises at least one selected from polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, polymethyl methacrylate, acrylonitrile butadiene styrene resin, epoxy resin, acrylic resin, novolac resin, and formaldehyde resin.

6. The vibration sensor of claim 1, wherein the first electrode and the second electrode are each independently comprises at least one selected from gold, titanium, platinum, nickel, palladium, copper, zinc, cadmium, iron, cobalt, iridium, tin, gallium, aluminum, manganese, chromium, molybdenum, tungsten, graphene, carbon nanotubes, and graphite.

7. The vibration sensor of claim 1, wherein the first electrode and the second electrode are each independently a titanium/gold layer in which a titanium layer and a gold layer are sequentially layered, the titanium layer of the first electrode is in contact with the substrate, and the titanium layer of the second electrode is in contact with the diaphragm.

8. The vibration sensor of claim 1, wherein the support and the thin film are each independently comprises at least one selected from epoxy resin, acrylic resin, novolac resin, formaldehyde resin, polymethyl methacrylate, polyparaxylylene (parylene, poly(p-xylylene)), polyethylene terephthalate, polybutylene terephthalate, polyethylene naphthalate, polyethylene, polypropylene, polystyrene, polycarbonate, polyamide, polyimide, polyurea, polyurethane, polydimethylsiloxane, polystyrene butadiene styrene, polystyrene ethylene butylene styrene, and polyacrylonitrile butadiene styrene.

9. The vibration sensor of claim 1, wherein a total thickness of the vibration sensor is 0.1 to 10 μm.

10. The vibration sensor of claim 1, wherein a diameter of the cylindrical hollow hole is 50 to 1000 μm.

11. The vibration sensor of claim 1, wherein the vibration sensor is an attachable vibration sensor.

12. The vibration sensor of claim 1, wherein the vibration sensor is attached to the neck skin of the human body to recognize a voice through vibration.

13. The vibration sensor of claim 1, wherein the vibration sensor recognizes a voice by detecting neck skin vibration acceleration of skin surfaces (neck skin) of speech organs (vocal folds and articulators) in linear proportion to sound pressure of sound generated by the speech organs and released into air.

14. The vibration sensor of claim 1, wherein the vibration sensor detects a frequency of 70 to 3,500 Hz.

15. The vibration sensor of claim 1, further comprising:
an adhesive layer provided between the first electrode and the support.

16. The vibration sensor of claim 15, wherein the adhesive layer comprises at least one selected from epoxy resin, acrylic resin, novolac resin, formaldehyde resin, polymethyl methacrylate, polystyrene, polyamide, polyimide, polyurea, polyurethane, and polydimethyl siloxane.

17. A vibration sensor array including a plurality of vibration sensors of claim 1.

* * * * *